(12) United States Patent
Witkowski et al.

(10) Patent No.: US 8,978,695 B2
(45) Date of Patent: *Mar. 17, 2015

(54) FLOWLINE FLAPPER VALVE

(75) Inventors: Brian Witkowski, Weatherford, TX (US); Nuder Said, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,562

(22) Filed: Sep. 10, 2012

(65) Prior Publication Data

US 2013/0000745 A1    Jan. 3, 2013

Related U.S. Application Data

(63) Continuation of application No. 12/763,786, filed on Apr. 20, 2010, now Pat. No. 8,261,771.

(60) Provisional application No. 61/170,917, filed on Apr. 20, 2009.

(51) Int. Cl.
*F16K 15/02* (2006.01)
*F16K 15/03* (2006.01)

(52) U.S. Cl.
CPC ..................... *F16K 15/03* (2013.01)
USPC ...................... 137/527.2; 137/15.19; 251/363

(58) Field of Classification Search
CPC ................................ F16K 15/03; F16K 1/20
USPC ............. 137/527, 527.2, 527.4, 527.8, 15.19; 251/363
See application file for complete search history.

(56) References Cited

U.S. PATENT DOCUMENTS

| 345,420 | A | 7/1886 | Eskholme et al. |
| 375,464 | A | 12/1887 | Thacher et al. |
| 580,226 | A | 4/1897 | Sanford |
| 741,477 | A | 10/1903 | Flinn |
| 1,201,022 | A | 10/1916 | Conniff |
| 1,379,092 | A | 5/1921 | Fraccascia |

(Continued)

FOREIGN PATENT DOCUMENTS

| AU | 1320088 A | 9/1988 |
| AU | 649744 B2 | 6/1994 |

(Continued)

OTHER PUBLICATIONS

International Search Report for Co-Pending PCT Application No. PCT/US2010/031738 mailed Dec. 27, 2010.

(Continued)

*Primary Examiner* — Kevin Lee
*Assistant Examiner* — Phyllis Nichols
(74) *Attorney, Agent, or Firm* — Gardere Wynne Sewell LLP

(57) ABSTRACT

A check valve assembly has a body having a central cavity intersected by upstream and downstream flow passages. A seat is secured by a threaded engagement in the upstream flow passage. An access bore intersects the cavity and has a support shoulder formed in it. A holder is supported on the support shoulder. A flapper is pivotally secured to the holder and located in the cavity for movement between an open position and a closed position blocking flow through the seat. A straight edge portion in the access bore engages a straight edge portion of the holder to prevent rotation of the holder. A fastener extends through a hole in the support shoulder into engagement with the seat to prevent rotation of the seat.

22 Claims, 4 Drawing Sheets

(56) References Cited

U.S. PATENT DOCUMENTS

| | | |
|---|---|---|
| 1,452,603 A | 4/1923 | Himes |
| 1,473,634 A | 11/1923 | Loudon |
| 1,483,001 A | 2/1924 | Kurre |
| 1,488,211 A | 3/1924 | Loeffler |
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| D86,952 S | 5/1932 | Garrison et al. |
| 1,889,256 A | 11/1932 | Lipscomb |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| D150,466 S | 8/1948 | Schuler |
| 2,506,162 A | 5/1950 | Metzgar |
| 2,576,431 A | 11/1951 | White |
| 2,587,212 A | 2/1952 | Placette |
| 2,589,144 A | 3/1952 | Russell et al. |
| 2,606,068 A | 8/1952 | Bonacor |
| 2,612,340 A | 9/1952 | Laurent |
| 2,663,458 A | 12/1953 | Macglashan |
| 2,694,503 A | 11/1954 | Young |
| 2,717,001 A | 9/1955 | Perrault |
| 2,746,773 A | 5/1956 | Bily |
| 2,766,999 A | 10/1956 | Watts |
| 2,795,459 A | 6/1957 | Cornelius |
| 2,923,317 A | 2/1960 | McInerney |
| 2,925,827 A | 2/1960 | Anderson et al. |
| 2,969,492 A | 1/1961 | Wheatley et al. |
| 3,024,047 A | 3/1962 | Schmohl |
| 3,060,961 A | 10/1962 | Conley |
| 3,061,267 A | 10/1962 | Hamer et al. |
| 3,064,940 A | 11/1962 | Anderson |
| 3,072,379 A | 1/1963 | Hamer |
| 3,108,939 A | 10/1963 | Sabins et al. |
| 3,113,792 A | 12/1963 | Brown |
| 3,150,681 A | 9/1964 | Hansen |
| 3,160,426 A | 12/1964 | Faeser |
| 3,204,484 A | 9/1965 | Gustafson et al. |
| 3,216,746 A | 11/1965 | Watts |
| 3,228,334 A | 1/1966 | Oss |
| 3,238,687 A | 3/1966 | Tisbo |
| 3,241,567 A | 3/1966 | Pusch |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain |
| 3,404,698 A | 10/1968 | Dorch |
| 3,425,661 A | 2/1969 | Mayo |
| 3,439,897 A | 4/1969 | Priese |
| 3,455,534 A | 7/1969 | Scaramucci |
| 3,467,224 A | 9/1969 | Curtis |
| 3,472,479 A | 10/1969 | Sherwood |
| 3,554,581 A | 1/1971 | Mason |
| 3,556,474 A | 1/1971 | Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,840,048 A | 10/1974 | Moen |
| 3,845,876 A | 11/1974 | Needham et al. |
| 3,845,879 A | 11/1974 | Dernbach et al. |
| 3,881,480 A | 5/1975 | LaFourcade |
| 3,894,718 A | 7/1975 | Koch et al. |
| 3,901,259 A | 8/1975 | Banbury |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A | 7/1976 | Kendrick |
| 3,972,364 A | 8/1976 | Brumm |
| 3,974,848 A | 8/1976 | Wheatley |
| 4,022,427 A | 5/1977 | Read |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,113,228 A | 9/1978 | Frye |
| 4,146,047 A | 3/1979 | Wood et al. |
| 4,150,847 A | 4/1979 | De Cenzo |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Hafele |
| 4,286,621 A | 9/1981 | Glahn |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,590,957 A | 5/1986 | McFarlane |
| 4,597,505 A | 7/1986 | Mozley et al. |
| 4,605,036 A | 8/1986 | Smith et al. |
| 4,616,803 A | 10/1986 | Schils |
| 4,667,570 A | 5/1987 | Jensen, Jr. et al. |
| 4,705,306 A | 11/1987 | Guido et al. |
| 4,716,930 A | 1/1988 | Richmond et al. |
| 4,732,215 A | 3/1988 | Hopper |
| 4,836,240 A | 6/1989 | Elliott |
| 4,842,014 A | 6/1989 | Strelow et al. |
| 4,848,398 A | 7/1989 | Leach |
| 4,864,696 A | 9/1989 | Mittermaier et al. |
| 4,896,367 A | 1/1990 | Newton et al. |
| 4,915,418 A | 4/1990 | Palatchy |
| 4,969,482 A | 11/1990 | Perrin et al. |
| 4,993,489 A | 2/1991 | McLeod |
| 5,025,865 A | 6/1991 | Caldwell et al. |
| 5,046,525 A | 9/1991 | Powell |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,165,478 A | 11/1992 | Wilson |
| 5,178,185 A | 1/1993 | Stehling et al. |
| 5,199,464 A | 4/1993 | Savard |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |

(56) References Cited

U.S. PATENT DOCUMENTS

| | | |
|---|---|---|
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor et al. |
| 6,770,177 B2 | 8/2004 | Keller et al. |
| 6,843,265 B2 | 1/2005 | Taylor |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. |
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards |
| D660,461 S | 5/2012 | Kotin |
| D660,984 S | 5/2012 | Kotin et al. |
| 8,196,229 B1 | 6/2012 | Hickok |
| D666,326 S | 8/2012 | Sims |
| 8,261,771 B2 * | 9/2012 | Witkowski et al. ........ 137/527.2 |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| D707,332 S | 6/2014 | Witkowski et al. |
| D707,797 S | 6/2014 | Wilkowski et al. |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0008934 A1 | 1/2009 | Matzner et al. |
| 2010/0154894 A1 | 6/2010 | Kotapish et al. |
| 2010/0258200 A1 | 10/2010 | Walker et al. |
| 2010/0326541 A1 | 12/2010 | Kugelev et al. |
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0316274 A1 | 12/2011 | Gronlund et al. |
| 2012/0025114 A1 | 2/2012 | Lymberopoulos et al. |
| 2012/0031494 A1 | 2/2012 | Lymberopoulos |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181015 A1 | 7/2012 | Kajaria et al. |
| 2012/0181016 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0000745 A1 | 1/2013 | Witkowski et al. |
| 2013/0020519 A1 | 1/2013 | Lymberopoulos |
| 2013/0037125 A1 | 2/2013 | Drake et al. |
| 2013/0248182 A1 | 9/2013 | Chong et al. |
| 2013/0299727 A1 | 11/2013 | Witkowski et al. |
| 2014/0048158 A1 | 2/2014 | Baca et al. |
| 2014/0048255 A1 | 2/2014 | Baca et al. |
| 2014/0048734 A1 | 2/2014 | Witkowski et al. |

FOREIGN PATENT DOCUMENTS

| | | |
|---|---|---|
| AU | 348253 | 5/2013 |
| CA | 2485817 A1 | 4/2005 |
| CA | 2490664 A1 | 10/2005 |
| CA | 2503231 A1 | 10/2005 |
| CA | 2612397 A1 | 6/2008 |
| CA | 2636751 A1 | 1/2009 |
| CN | 2118877 U | 10/1992 |

(56) References Cited

FOREIGN PATENT DOCUMENTS

| | | |
|---|---|---|
| CN | 1137309 A | 12/1996 |
| CN | 1225298 A | 8/1999 |
| CN | 2426550 Y | 4/2001 |
| CN | 1548701 A | 11/2004 |
| CN | 2901281 Y | 5/2007 |
| CN | 200999609 Y | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 101367099 A | 2/2009 |
| CN | 201206648 Y | 3/2009 |
| CN | 201262043 Y | 6/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202047762 U | 11/2011 |
| CN | 102323158 A | 1/2012 |
| CN | 202144943 U | 2/2012 |
| CN | 202208237 U | 5/2012 |
| CN | 202255848 U | 5/2012 |
| CN | 202255937 U | 5/2012 |
| CN | 202718658 U | 2/2013 |
| CN | ZL2013300399164 | 9/2013 |
| CN | ZL201330441389 | 4/2014 |
| CN | ZL201080025350.3 | 5/2014 |
| CN | ZL201330441241.6 | 5/2014 |
| DE | 1166571 B | 3/1964 |
| DE | 2415732 A1 | 10/1974 |
| DE | 2358756 A1 | 3/1975 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EM | 002185371-0001 | 2/2013 |
| EM | 002307421-0001 | 9/2013 |
| EM | 002307421-0002 | 9/2013 |
| EP | 44619 A1 | 1/1982 |
| EP | 0559131 A1 | 9/1993 |
| EP | 1219942 A1 | 7/2002 |
| EP | 1488867 A1 | 12/2004 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 6/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |
| IN | 251691 | 8/2012 |
| JP | 53108873 A | 9/1978 |
| JP | 53125261 A | 11/1978 |
| JP | 57073187 | 5/1982 |
| JP | 57079400 | 5/1982 |
| JP | 61093344 | 5/1986 |
| JP | 08075022 | 3/1996 |
| JP | 08128536 | 5/1996 |
| JP | 08291543 A | 11/1996 |
| JP | 08300052 | 11/1996 |
| JP | 10175026 | 6/1998 |
| JP | 2000330646 | 11/2000 |
| JP | 2001355774 A | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 8/2012 |
| JP | 05033883 | 9/2012 |
| KR | 100540389 B1 | 12/2005 |
| KR | 100540390 B1 | 12/2005 |
| KR | 100540392 B1 | 12/2005 |
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 2011012944 A | 6/2012 |
| MX | 40533 | 12/2013 |
| RU | 1466084 C | 6/1995 |
| RU | 1417281 C | 7/1995 |
| RU | 02088831 C1 | 8/1997 |
| RU | 2242313 C2 | 12/2004 |
| RU | 2367770 C1 | 9/2009 |
| RU | 2367771 C1 | 9/2009 |
| SG | 175263 A1 | 11/2011 |
| SG | 176534 A1 | 1/2012 |
| SG | D2013186 G | 4/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | WO-9713398 A2 | 4/1997 |
| WO | WO-2009023042 A1 | 2/2009 |
| WO | WO-2010080636 A2 | 7/2010 |
| WO | WO-2010123889 A2 | 10/2010 |
| WO | WO-2010141651 A2 | 12/2010 |
| WO | WO-2010151680 A2 | 12/2010 |
| WO | WO-2011095453 A1 | 8/2011 |
| WO | WO-2013023154 A1 | 2/2013 |
| WO | WO-2014028498 A2 | 2/2014 |
| WO | WO-2014028795 A2 | 2/2014 |

OTHER PUBLICATIONS

European Search Report mailed Mar. 14, 2013 in corresponding EP Application No. 10767632.
"Canadian Examiner's Report issued Feb. 10, 2014, by CIPO, re App No. 152957".
"Eurasian Office Action issued Nov. 19, 2013, by The Eurasian Patent Office, re App No. 201171356".
"International Search Report and Written Opinion by the ISA/US, mailed Feb. 7, 2014, re PCT/US2013/054741".
"Notice of Allowance mailed Feb. 7, 2014, by the USPTO, re U.S. Appl. No. 29/449,852".
"Notice of Allowance mailed Feb. 7, 2014, by the USPTO, re U.S. Appl. No. 29/449,867".
"Notice of Allowance mailed Jan. 16, 2014, by the USPTO, re U.S. Appl. No. 29/453,837".
"Notice of Allowance mailed Nov. 22, 2013, by the USPTO, re U.S. Appl. No. 12/822,900".
"Notice of Allowance mailed Nov. 26, 2013, by the USPTO, re U.S. Appl. No. 29/429,809".
"Office Action mailed Mar. 27, 2014, by the USPTO, re U.S. Appl. No. 13/918,479".
"Russian Office Action, issued by the Russian Patent Office, re App No. 2013500548", Nov. 20, 2013.
Brazil Office Action, dated Jun. 3, 2014, re App No. BR3020130006611.
Canadian Examination Report, by CIPO, mailed Feb. 10, 2014, re App No. 152956.
Canadian Examination Report dated Apr. 28, 2014, by the CIPO, re App No. 2764310.

(56) References Cited

OTHER PUBLICATIONS

Canadian Examination Report dated Feb. 7, 2014, by the CIPO, re App No. 149748.
Second Written Opinion, by the IPEA/US, mailed Jul. 28, 2014, re PCT/US2013/054741.
European Exam Report, by the EPO, dated Apr. 8, 2014, re App No. 10784052.2.
Final Office Action mailed Feb. 28, 2014, by the USPTO, re U.S. Appl. No. 12/165,680.
Notice of Allowance mailed Jun. 25, 2014, by the USPTO, re U.S. Appl. No. 12/165,680.
Office Action mailed Jun. 18, 2014, by the USPTO, re U.S. Appl. No. 13/572,293.
4" Halliburton Big Inch Clamp Connection spec sheet (1 page), Apr. 17, 2007.
BJ 285959—3 Inch 15,000 PSi Popoff Valve, Mar. 26, 2004 (1 page).
BS&B Safety Systems "An Introduction to Rupture Disk Technology," Catalog 77-1001 (3 pages), 1994.
CN OA 2010800253503 mailed Jun. 5, 2013 (8 pages).
EP Search Report mailed Jan. 30, 2013 for EP09838004.1 (4 pages).
Grayloc(r) Products, 3" flange diameter, Jul. 24, 2006 (2 pages).
Harrisburg, Inc., "Reset Relief Valves" brochure, (c) 1982) (2 pages).
HP70-001 OA for U.S. Appl. No. 06/419,141 mailed Nov. 17, 1983 (4 pages).
HP70-006 OA for U.S. Appl. No. 08/643,239 mailed Dec. 30, 1996 (11 pages).
HP70-011 NOA for U.S. Appl. No. 10/690,888 mailed Aug. 29, 2005 (7 pages).
HP70-016 NOA for U.S. Appl. No. 10/833,859 mailed Jul. 6, 2005 (4 pages).
HP70-016 OA for U.S. Appl. No. 10/833,859 mailed Dec. 22, 2004 (5 pages).
HP70-021 NOA for U.S. Appl. No. 11/013,486 mailed Feb. 12, 2007 (4 pages).
HP70-021 NOA for U.S. Appl. No. 11/414,984 mailed Feb. 11, 2009 (8 pages).
HP70-021 OA for U.S. Appl. No. 11/013,486 mailed Aug. 30, 2005 (12 pages).
HP70-022 NOA for U.S. Appl. No. 11/354,663 mailed Jun. 29, 2010 (4 pages).
HP70-022 OA for U.S. Appl. No. 11/354,663 mailed Jan. 8, 2010 (6 pages).
HP70-022 U.S. Appl. No. 60/653,014 (16 pages), Feb. 15, 2005.
HP70-023 CA 2612397 NOA mailed Dec. 20, 2012 (1 page).
HP70-023 NOA for U.S. Appl. No. 11/638,965 mailed Sep. 23, 2008 (6 pages).
HP70-023 OA for U.S. Appl. No. 11/638,965 mailed Apr. 4, 2008 (10 pages).
HP70-024 Advisory Action mailed May 20, 2013 for U.S. Appl. No. 12/165,680 (3 pages).
HP70-024 Final Office Action dated Jan. 31, 2012 for U.S. Appl. No. 12/165,680 (28 pages).
HP70-024 Final Office Action dated Mar. 7, 2013 U.S. Appl. No. 12/165,680 (23 pages).
HP70-024 Office Action mailed Aug. 9, 2011 for U.S. Appl. No. 12/165,680 (18 pages).
HP70-024 Office Action mailed Jul. 12, 2013 for U.S. Appl. No. 12/165,680 (24 pages).
HP70-024 Office Action mailed May 31, 2011 for GB 0812086.7 (2 pages).
HP70-024 U.S. Appl. No. 60/947,738 (12 pages), Jul. 3, 2007.
HP70-029 ISR and WO for PCT/US2009/068822 mailed Aug. 9, 2010 (7 pages).
HP70-029 OA for U.S. Appl. No. 12/642,541 mailed Mar. 19, 2012 (15 pages).
HP70-036 EP Extended SR for EP10767632.2 mailed Mar. 14, 2013 (6 pages).
HP70-036 EP SR for EP10767632.2 mailed Mar. 14, 2013 (6 pages).
HP70-036 ISR and WO for PCT/US2010/031738 mailed Dec. 27, 2010 (7 pages).
HP70-036 NOA for U.S. Appl. No. 12/763,786 mailed May 16, 2012 (6 pages).
HP70-036 OA for U.S. Appl. No. 12/763,786 mailed Oct. 11, 2011 (9 pages).
HP70-036 OA for U.S. Appl. No. 13/608,562 mailed Sep. 13, 2013 (12 pages).
HP70-036 U.S. Appl. No. 61/170,917 (9 pages), Apr. 20, 2009.
HP70-037 EP Extended SR for EP10784052.2 mailed Jul. 4, 2013 (7 pages).
HP70-037 ISR and WO for PCTUS2010/037156 mailed Jan. 13, 2011 (8 pages).
HP70-037 NOA for U.S. Appl. No. 12/793,194 mailed Feb. 19, 2013 (10 pages).
HP70-037 OA for U.S. Appl. No. 12/793,194 mailed Oct. 25, 2012 (8 pages).
HP70-039 FOA for U.S. Appl. No. 12/822,900 mailed Aug. 16, 2013 (15 pages).
HP70-039 ISR and WO for PCT/US2010/039834 Feb. 8, 2011 (6 pages).
HP70-039 OA for U.S. Appl. No. 12/822,900 mailed Dec. 6, 2012 (20 pages).
HP70-039 U.S. Appl. No. 61/220,067 (12 pages), Jun. 24, 2009.
HP70-072 IPRP for PCT/US2012/050376 mailed Jul. 15, 2013 (28 pages).
HP70-072 ISR and WO for PCT/US2012/050376 mailed Oct. 26, 2012 (2 pages).
HP70-072 U.S. Appl. No. 61/522,234 (23 pages), Feb. 8, 2011.
HP70-714 IN Exam Report for IN Design 251691 mailed Jun. 26, 2013 (2 pages).
HP70-714 Design U.S. Appl. No. 29/429,809 (4 pages), Aug. 16, 2012.
HP70-715 Design U.S. Appl. No. 29/449,852 (7 pages), Mar. 15, 2013.
HP70-716 Design U.S. Appl. No. 29/449,867 (8 pages), Mar. 15, 2013.
HP70-720 Design U.S. Appl. No. 29/453,837 (8 pages), May 3, 2013.
S.P.M. Flow Control, Inc. (Weir SPM), "Long Radius Swivel Joints," 2007 (5 pages).
S.P.M. Flow Control, Inc., "4-Inch Integral Swivel Joint" (1 page), Mar. 2012.
S.P.M. Flow Control, Inc., "Flow Control Products and Drilling Equipment for the Worldwide Petroleum Industry," [online] Jan. 8, 2007, <URL:www.spmflo.com>.
S.P.M. Flow Control, Inc., "High-Pressure Long Radius Swivel Joints," 2002, www.spmflo.com (1 page).
S.P.M. Flow Control, Inc., "Long Radius Swivel Joints, H2S, Operating and Maintenance Instructions," 1999 (6 pages).
S.P.M. Flow Control, Inc., "Long Radius Swivel Joints, Operating and Maintenance Instructions," 2004 (4 pages).
S.P.M. Flow Control, Inc., "Long Radius Swivel Joints, Operating and Maintenance Instructions," 2006 (6 pages).
S.P.M. Flow Control, Inc., "Swivel Joints," 1999 (1 page).
S.P.M. Flow Control, Inc., Valve Illustration Retsco (1 page), Sep. 16, 1999.
SPM "Emergency Relief Valve Brochure" 1997 (4 pages).
Venture Oilfield Services, Ltd., Oilfield Drawing (1 page), Oct. 15, 1982.

\* cited by examiner

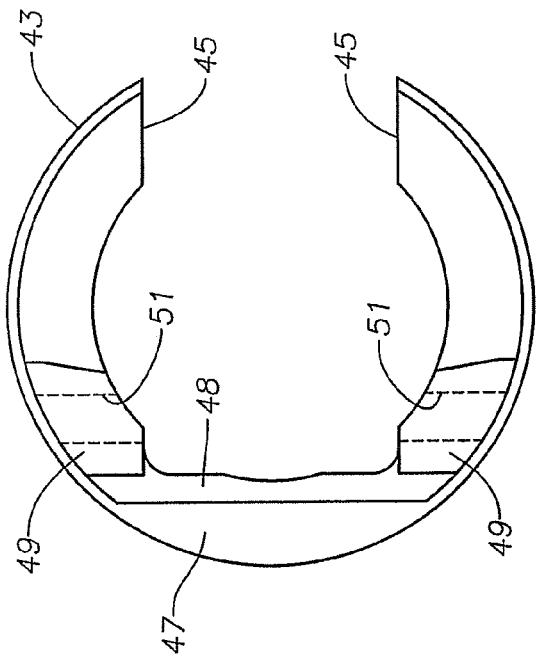
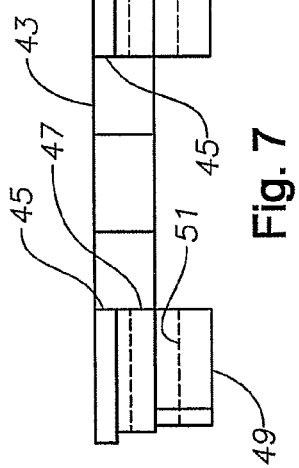
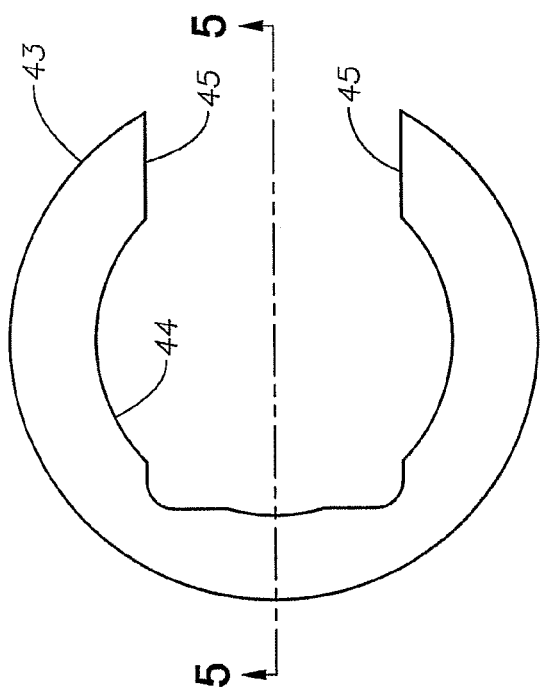
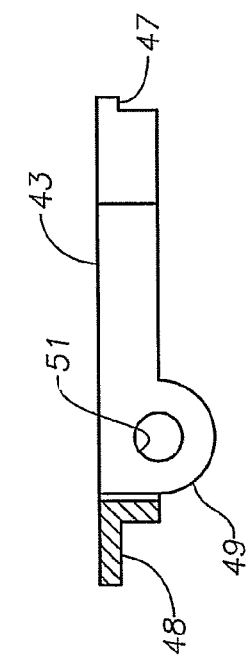

FLOWLINE FLAPPER VALVE

CROSS-REFERENCE TO RELATED APPLICATIONS

This application is a continuation of U.S. application Ser. No. 12/763,786, filed Apr. 20, 2010, now U.S. Pat. No. 8,261,771, which claims the benefit of provisional patent application Ser. No. 61/170,917, filed Apr. 20, 2009, both of which are incorporated herein by reference in their entirety.

TECHNICAL FIELD

This invention relates in general to flowline check valves, and particularly to a flapper valve for use in oilfield service operations.

BACKGROUND OF THE DISCLOSURE

Check valves are commonly used in well hydraulic fracturing operations. Large pumps are connected by flow lines to a well for pumping a liquid such as water into the well at high pressures to fracture the earth formation. Various check valves are coupled into the flow lines to prevent back flow to the pumps.

A typical check valve has a body with upstream and downstream flow passages separated by a central cavity. A valve seat is pressed with an interference fit into the downstream flow passage. A flapper assembly is inserted through an access bore in the body for engaging the valve seat.

While this type of check valve works well, a high flow rate through the check valve may tend to cause the seat to dislodge from the flow passage. Other improvements are also desirable, such as simplifying the flapper assembly.

SUMMARY

The flapper valve assembly has a body with upstream and downstream flow passages separated by a cavity. An access bore extends into the cavity transverse to the flow passages. The valve seat is secured by a threaded arrangement in the upstream flow passage, rather than by press fitting. A holder for a flapper is supported on a support shoulder in the access bore. The flapper is pivotally mounted to the holder and extends into the cavity. An anti-rotation device prevents rotation of the holder in the access bore.

In the preferred embodiment, the anti-rotation device comprises a straight edge portion formed in the access bore below the shoulder. The holder has a depending lip with a straight edge portion that engages the straight edge portion in the access bore.

The support shoulder has a wider section above the seat in the preferred embodiment. A fastener extends through a hole in the wider portion of the support shoulder into engagement with the seat to prevent rotation of the seat.

Preferably, the seat has an upstream side that abuts and is sealed to a downstream facing shoulder in the upstream passage in the body. The seat may have an external flange on its downstream side. In the preferred embodiment, the flange has an upstream facing shoulder that is spaced from an upstream wall of the cavity by a gap. The fastener may be a set screw that engages the rim of the flange.

DESCRIPTION OF THE FIGURES

FIG. 4 is a top view of a holder for the flapper valve of FIG. 1.

FIG. 5 is a sectional view of the holder of FIG. 4, taken along the line 5-5 of Figure.

FIG. 6 is a bottom view of the holder of FIG. 4.

FIG. 7 is a side elevational view, as seen from the right side, of the holder of FIG. 4.

DETAILED DESCRIPTION

Figure 2:
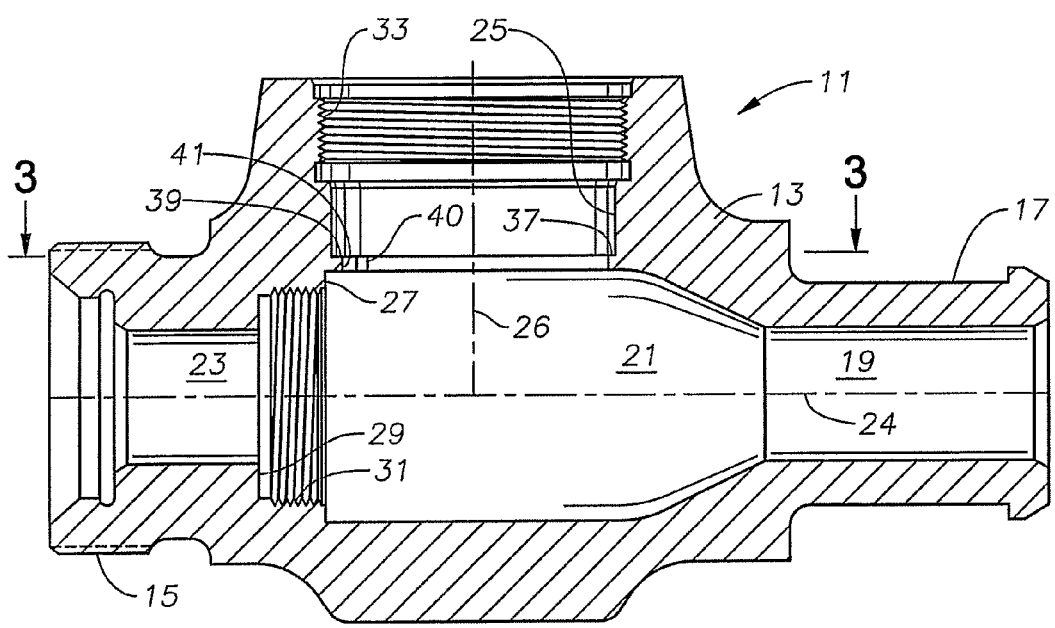
FIG. 2 is a sectional view of the body of the flapper valve of FIG. 1, with the components removed.

Referring to FIG. 2, flapper valve 11 has a body 13 with an upstream end 15 and a downstream end 17. Body 13 is normally connected into a flowline that will have flow in a single direction, which is from the upstream end 15 toward the downstream end 17. In this example, upstream end 15 has external threads for receiving a collar of a conventional coupling union. Downstream end 17 is in the mating configuration of the coupling union. However downstream and upstream ends 17, 15 could be reversed. Also, other types of connections rather than union type couplings could be utilized, such as clamps.

Body 13 has an upstream passage 23, a central cavity or chamber 21, and a downstream passage 19. Upstream passage 23 and downstream passage 19 are coaxial along a flow passage axis 24. An access bore 25 is formed in body 13 for access to central chamber 21. Access bore 25 is located on an axis 26 that is preferably perpendicular to and intersects flow passage axis 24.

An upstream wall or shoulder 27 is located at an intersection between the upstream end of central chamber 21 and upstream passage 23. This shoulder, referred to herein as junction shoulder 27, is in a plane perpendicular to axis 24. Upstream passage 23 has a counterbore that begins at junction shoulder 27 and extends upstream a selected distance, terminating at a counterbore shoulder 29. Counterbore shoulder 29 is also in a plane perpendicular to axis 24 and faces downstream. A set of threads 31 is formed in upstream passage 23 between junction shoulder 27 and counterbore shoulder 29. Preferably, threads 31 begin at junction shoulder 27 and terminate before reaching counterbore shoulder 29.

Figure 3:
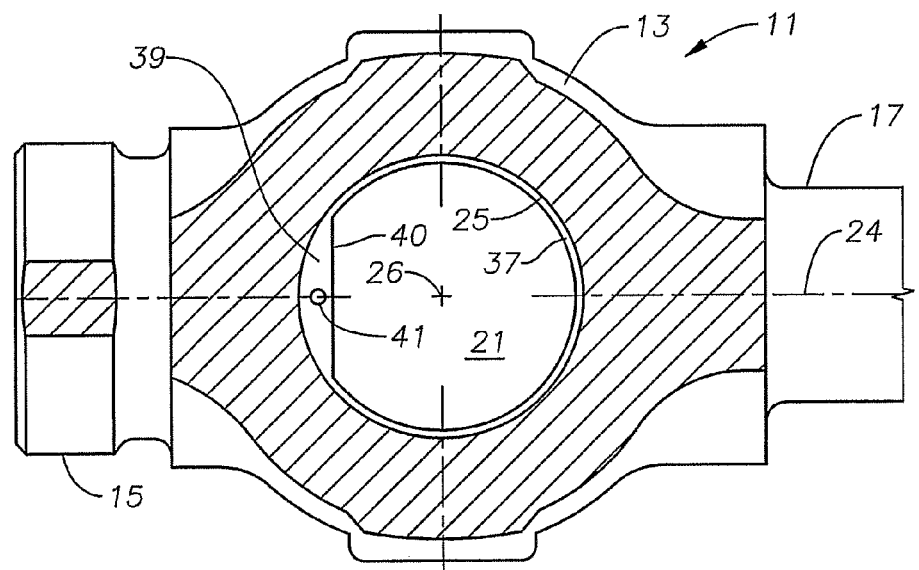
FIG. 3 is a sectional view of the body of the flapper valve taken along the line 3-3 of FIG. 2.

Access bore 25 also has a set of internal threads 33. Threads 33 are adapted to receive a cap 35, shown by dotted lines in FIG. 1, which forms a seal within access bore 25. An access bore support shoulder 37 faces upward towards threads 33. Access bore shoulder 37 is annular but has a greater radial dimension or width relative to access bore axis 26 on its upstream side, defining a ledge 39. The radial dimension of ledge 39 is the radial distance along a radial line from axis 26 from the sidewall of access bore 25 to the end 40 of ledge 39. End 40 of ledge 39, which is also shown in FIG. 3, is a straight edge located in a plane perpendicular to flow passage axis 24. Ledge end 40 could be other than straight, however. A hole 41, preferably threaded, is located within ledge 39 and extends downward into central chamber 21.

Referring also to FIG. 4, a holder 43 is supported on access bore shoulder 37 and ledge 39. Holder 43 is flat disk having a large central opening 44. In this example, holder 43 has a horse shoe shape, with two downstream ends 45 that define a gap or entrance to inner opening 44; however ends 45 could be eliminated to make holder 43 completely annular, if desired. As shown in FIG. 5, holder 43 has a depending lip 47 that extends along its periphery. Lip 47 has a portion that has approximately the same radial dimension as access bore shoulder 37, relative to access bore axis 26. As shown in FIG. 6, lip 47 has a greater radial dimension or thickness on its upstream side that matches the radial dimension of ledge 39. Lip 47 has a straight edge portion 48 that matches and contacts axis bore shoulder straight edge portion 40. When in flush contact with each other straight edge portions 40, 48 serve as an anti-rotation device to prevent rotation of holder 43.

As shown also in FIGS. 6 and 7, holder 43 has two spaced-apart hinge blocks 49 on its lower side. Hinge blocks 49 are located at the upstream side of holder 43 and are spaced apart from each other by inner opening 44. Each hinge block 49 has a hole 51 extending through it. As shown in FIG. 5, each hole 51 is preferably oblong. The center points of holes 51 coincide with each other.

Figure 1:
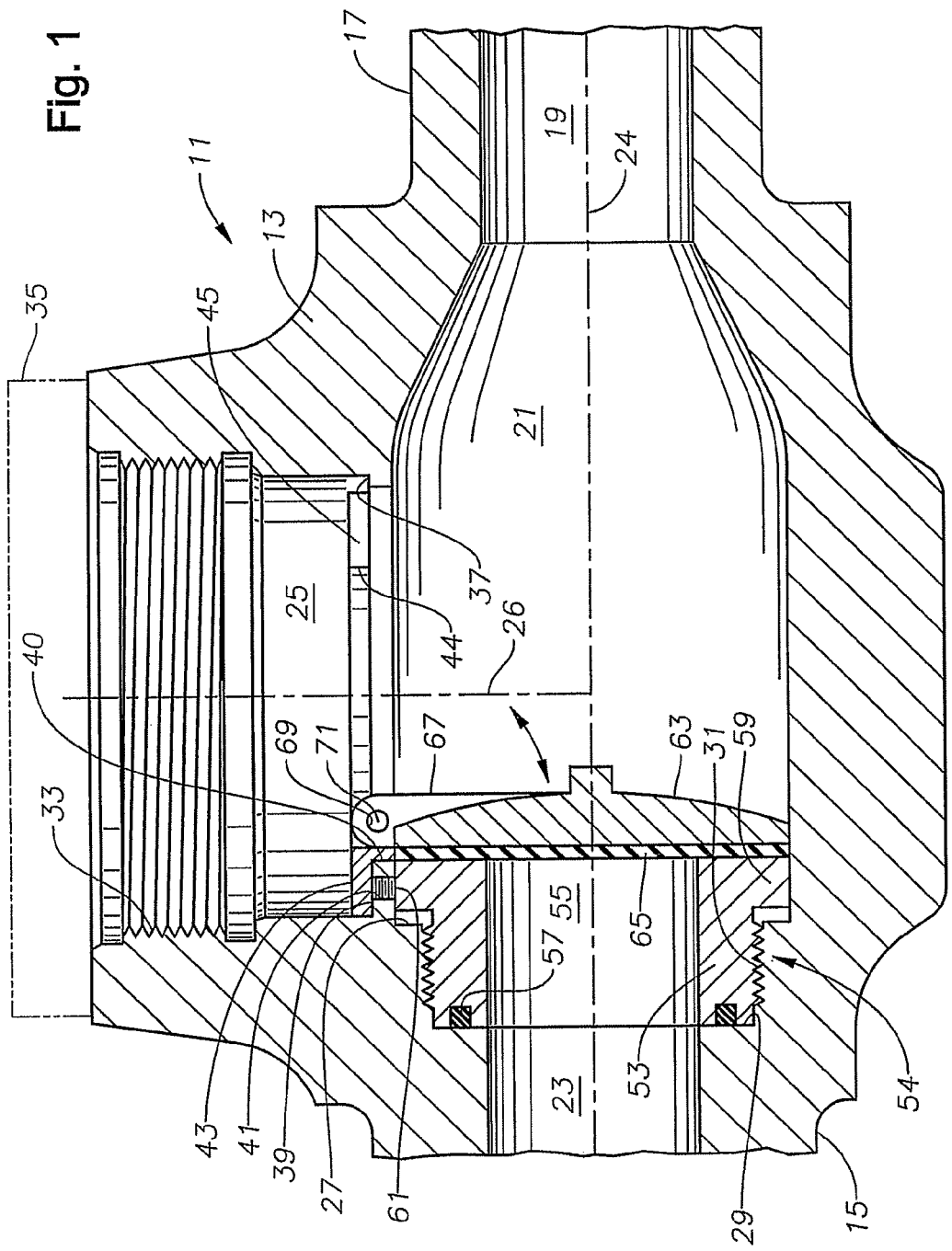
FIG. 1 is a sectional view of a flapper valve constructed in accordance with this invention.

Referring to FIG. 1, a seat 53 has exterior threads 54 that engage internal threads 31 of upstream passage 23. Rather than locating exterior threads 54 directly on seat 53, other threaded arrangements are feasible, such as employing a separate threaded retainer ring. Seat 53 has an orifice or seat passage 55 that extends through it; passage 55 is coaxial with and the same diameter as flowline passages 23 and 19. Seat 53 has a circular seal 57 on its upstream end that abuts and seals against counterbore shoulder 29. As best shown in FIG. 1, an outer diameter of circular seal 57 can be less than an outer diameter of seat 53 and in inner diameter of circular seal 57 can be greater than an inner diameter of seat 53. Therefore, seal 57 can be located on the face of the upstream end of seat 53 and spaced apart from the circumference of seat 53. Alternately, a seal around a circumference of the upstream end of seat 53 in engagement with an unthreaded portion of upstream passage 23 may be feasible. Seat 53 has an external flange 59 on its downstream end that has a greater outer diameter than its threads 54. The outer diameter of flange 59 is approximately the same as the inner diameter of central chamber 21 at the upstream end of central chamber 21. Flange 59 has an upstream facing side that is spaced from junction shoulder 27 by a gap. A set screw 61 extends through hole 51 and engages the outer diameter of flange 59 to prevent seat 53 from loosening from threads 31.

Figure 8:
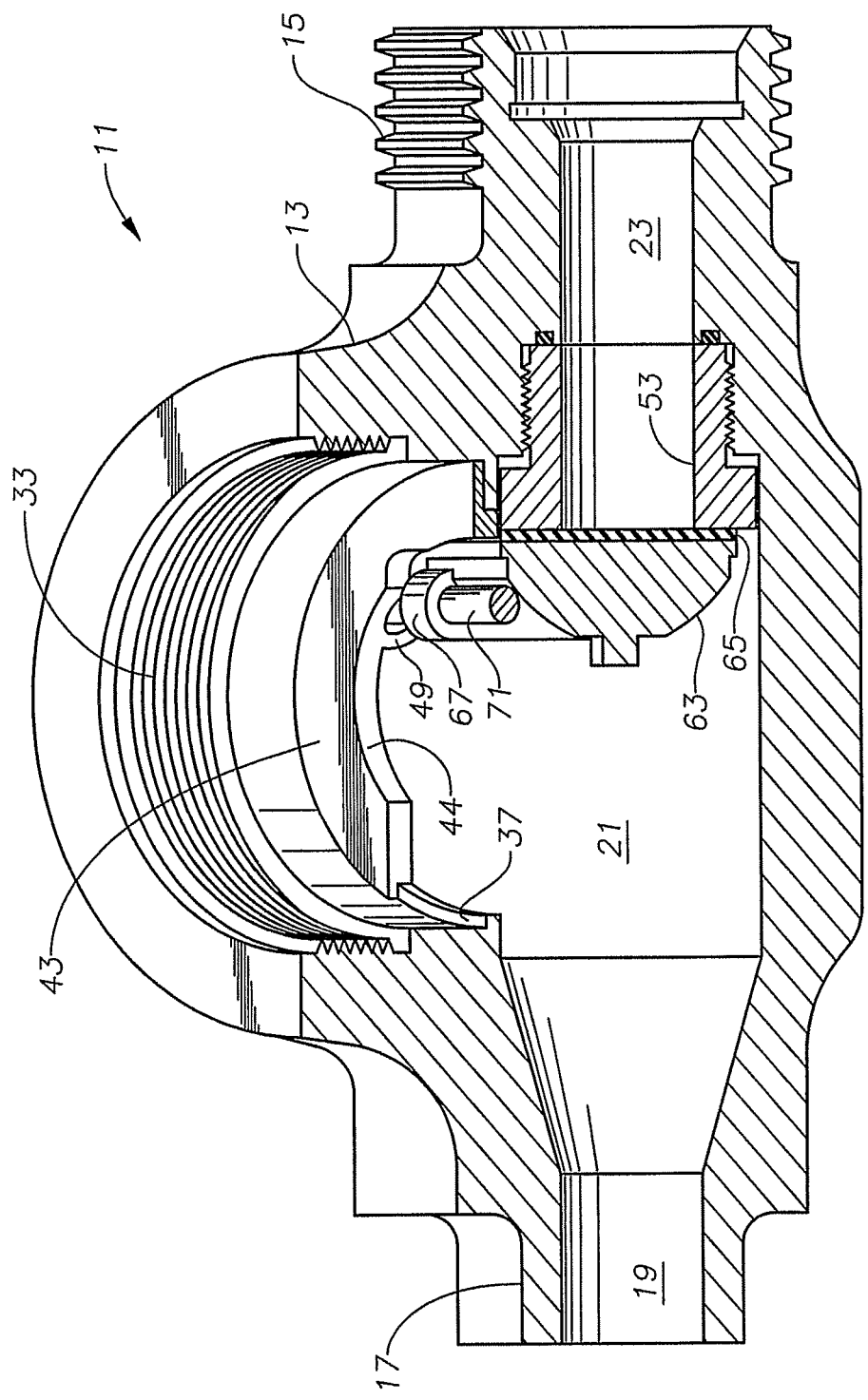
FIG. 8 is a perspective view, partially sectioned, of the flapper valve of FIG. 1.

Referring still to FIG. 1, a flapper 63 may have a gasket 65 on its upstream side for engaging the downstream side of seat 53 to block any reverse flow from central chamber 21 into upstream passage 23. Flapper 63 is pivotally connected to holder 43 by a clevis 67 comprising two lugs (only one shown). Clevis 67 fits between the two hinge blocks 49 (FIG. 6). Clevis 67 has cylindrical holes 69 that align with hinge block oblong holes 51 (FIG. 6). A single pin 71 extends through holes 69 and 51 to pivotally secure flapper 63 to holder 43. FIG. 8 illustrates one of the arms of clevis 67 and pin 71.

Flapper valve 11 is assembled by securing seat 53 to threads 31. Set screw 61 will be secured against seat flange 59. Clevis 67 is pinned to holder 43, and then the assembly of flapper 63 and holder 43 is inserted into access bore 25. Holder 43 will self-align itself because its hinge blocks 49 will abut end 40 of ledge 39 as well as lip straight edge portion 48. The engagement of the hinge blocks 49 and lip straight edge portion 48 with ledge end 40 prevents any rotation of holder 43 about axis 26 of access bore 25. Cap 35 is then secured into access bore 25 to form a seal with access bore 25. A lower portion of cap 35 abuts an upper side of holder 43 to retain holder 43 on access bore shoulder 37.

In operation, the normal flow will be from the left side of FIG. 1 toward the right. The flow from upstream passage 23 to the right causes flapper 63 to swing open as indicated by the arrow. When the flow pressure ceases, gravity will cause flapper 63 to move back to the position shown in FIG. 1. If by accident, the fluid pressure becomes higher in downstream passage 19 than in upstream passage 23, the engagement of flapper 63 with seat 53 will prevent any flow in the reverse direction. The threaded engagement of seat 53 in upstream flow passage 23 reduces the chance for downstream flow to dislodge seat 53 from upstream flow passage 23.

While the invention has been shown in only one of its forms, it should be apparent to those skilled in the art that it is not so limited but is susceptible to various changes without departing from the scope of the invention.

What is claimed is:

1. A check valve assembly, comprising:
    a body having a central cavity intersected by upstream and downstream flow passages;
    a shoulder formed in the body;
    a holder positionable onto the shoulder, the holder including a lip extending around its periphery to facilitate complimentary engagement with the shoulder
    a flapper pivotally secured to the holder, the flapper movable between a closed position, to block fluid flow through the upstream flow passage, and an open position, to enable fluid flow through the upstream flow passage; and
    a seat disposed proximate the upstream flow passage, the seat including exterior threads threadingly engaging corresponding internal threads on the upstream flow passage, the seat includes a downstream side having a larger diameter than an upstream side of the seat and the diameter of the seat threads to define a flange having an upstream facing shoulder, wherein the seat is configured to engage the flapper when the flapper is in the closed position.

2. The assembly of claim 1, further comprising an access bore intersecting the cavity, wherein:
    the shoulder is formed in the access bore;
    the shoulder has a predetermined first width and a ledge having a width larger than the first width;
    a portion of the lip has an increased width to facilitate complementary engagement with the ledge to prevent rotational movement of the holder relative to the access bore;
    the ledge includes a straight edge configured to mate with a corresponding straight edge on the holder lip to prevent rotational movement of the holder relative to the access bore.

3. The assembly of claim 2, wherein the ledge is proximate the upstream flow passage.

4. The assembly of claim 2, further comprising an opening extending through the ledge for receiving a fastener to engage with and prevent movement of the seat from within the upstream passage.

5. The assembly of claim 1, wherein the upstream passage includes a counterbore that defines a downstream facing shoulder and wherein an upstream end of the seat abuts the downstream facing shoulder, the upstream end of the seat having a seal that abuts and seals against the downstream facing shoulder.

6. The assembly of claim 1, wherein the holder further comprises a pair of hinge blocks, each hinge block including an opening that is axially aligned with the other opening to receive a pin to pivotally secure the flapper to the holder.

7. The assembly of claim 1, wherein the flapper is pivotally connected to the holder by a clevis.

8. A check valve assembly, comprising:
a body having a central cavity intersected by upstream and downstream flow passages;
a shoulder formed in the body;
a holder positionable onto the shoulder, the holder including a lip extending around its periphery to facilitate complimentary engagement with the shoulder
a flapper pivotally secured to the holder, the flapper movable between a closed position, to block fluid flow through the upstream flow passage, and an open position, to enable fluid flow through the upstream flow passage; and
a seat disposed proximate the upstream flow passage, the seat includes a downstream side having a larger diameter than an upstream side of the seat to define a flange having an upstream facing shoulder, wherein the seat is configured to engage the flapper when the flapper is in the closed position, and the upstream facing shoulder is spaced apart from and forming a gap between an upstream wall of the central cavity.

9. A check valve assembly, comprising:
a body having a central cavity intersected by upstream and downstream flow passages;
the upstream flow passage having a set of internal threads adjacent the cavity and a downstream facing shoulder upstream from the internal threads;
a seat having upstream and downstream sides, a central orifice extending therethrough, an outer surface having a set of external threads that engage the internal threads in the upstream flow passage, the upstream side of the seat having a seal and abutting the downstream facing shoulder and the downstream side of the seat having a larger diameter than an upstream side of the seat defining a flange, the flange having an upstream facing shoulder that is spaced apart to form a gap between an upstream wall of the cavity;
a support shoulder extending at least partly around an interior of the access bore;
a holder supported on the shoulder, the holder having a central opening and a hinge block;
an anti-rotation device on the holder to resist rotation of the holder; and
a flapper pivotally secured to the hinge block and movable between an open position, to facilitate fluid flow through the upstream flow passage, and a closed position, to block fluid flow through the upstream flow passage.

10. The assembly of claim 9 wherein the anti-rotation device comprises a straight edge on the support shoulder and a corresponding lip on the holder, the lip having a straight portion that abuts the straight edge to resist rotation of the holder.

11. The assembly of claim 9, wherein:
the support shoulder extends around an access bore, wherein the width of the support shoulder is greater above the seat than the remaining portions of the support shoulder;
a hole formed in the greater width portion; and
a fastener extending through the hole and into engagement with the seat, the fastener preventing the seat from rotating within the upstream passage.

12. The assembly of claim 11, further comprising:
a set of threads formed in the access bore above the support shoulder; and
a cap that secures to the threads in the access bore and abuts an upper side of the holder to retain the holder on the support shoulder.

13. The assembly of claim 9, wherein the anti-rotation device comprises a straight edge formed on the support shoulder and wherein the hinge block engages the straight edge to resist rotational movement of the holder.

14. A check valve assembly, comprising:
a body having a central cavity intersected by upstream and downstream flow passages, the upstream passage having a counterbore that defines a downstream facing shoulder;
a seat having upstream and downstream sides and a central orifice extending therethrough, and an external flange on the downstream side of the seat that is spaced apart from an upstream wall of the cavity by a gap, the upstream side of the seat having a seal and abutting the downstream facing shoulder of the body;
a support shoulder;
a fastener extending through a hole in the support shoulder into engagement with the seat to prevent rotation of the seat;
a holder having a central opening and supported on the support shoulder;
a straight edge portion extending on the support shoulder and engaged by a corresponding lip on the holder to prevent rotation of the holder; and
a flapper pivotally secured to the at least one hinge block on the holder, the flapper disposed in the cavity for movement between an open position and a closed position for blocking flow through the orifice of the seat.

15. The valve assembly of claim 14 further including a pair of spaced apart hinge blocks on the holder.

16. The valve assembly according to claim 14, wherein the holder is generally in the shape of a horse-shoe.

17. The check valve assembly according to claim 14, wherein the holder is removable from an access bore.

18. A holder for a flapper used in a check valve assembly, the check valve assembly comprising a body having a central cavity intersected by upstream and downstream flow passages, a seat disposed proximate and secured to the upstream flow passage by threads, the seat including a downstream side having a larger diameter than the threads and an upstream side of the seat to define a flange having an upstream facing shoulder, a shoulder having a predetermined first width and includes a ledge portion having a width larger than the first width, and a flapper pivotally secured to the holder and movable between an open and closed position to block fluid flow through the upstream flow passage, the holder comprising:
a lip to facilitate complimentary engagement with the shoulder, wherein a portion of the lip has an increased width to facilitate complementary engagement with the ledge portion to prevent rotational movement of the holder.

19. The holder of claim 18 further comprising a straight edge on the holder lip configured to mate with a corresponding straight edge on the ledge to prevent movement of the holder relative to an access bore from which the shoulder extends.

20. A method of assembling a check valve assembly, the valve assembly having a body with a central cavity intersected by upstream and downstream flow passages, the method comprising:
pivotally securing a flapper to a holder member, the holder member including a lip extending around an outer periphery of the holder member, a portion of the lip having an increased width;
securing a seat having a central orifice in the upstream flow passage, the seat including a downstream side having a larger diameter than an upstream side of the seat to define a flange having an upstream facing shoulder, wherein the method further comprises positioning the seat such that a gap is formed between the seat and an upstream wall of the cavity;

inserting the holder member and flapper and positioning the holder member on a shoulder, the shoulder having a predetermined first width and including a ledge portion having a width larger than the first width; and aligning the lip with the shoulder to facilitate complimentary engagement therewith to prevent rotational movement of the holder member and position the flapper within the central cavity for movement between an open and closed position to facilitate fluid flow therethrough.

21. The method of claim 20, wherein the upstream passage includes a counterbore that defines a downstream facing shoulder, wherein the method includes positioning an upstream end of the seat to abut the downstream facing shoulder such that a seal on the upstream end of the seat abuts and seals against the downstream facing shoulder.

22. The method of claim 20 further comprising inserting a fastener through an opening extending through the ledge to engage and prevent movement of the seat from within the upstream passage.

\* \* \* \* \*